2,821,486

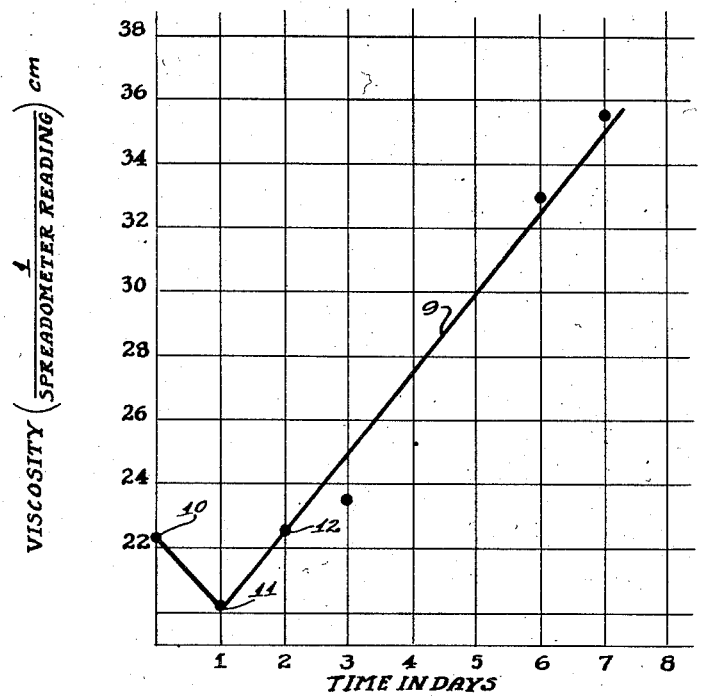

DECORATING GLASS WITH ORGANIC INK

Anna S. Naff, Bowling Green, and Robert M. Smith, Toledo, Ohio, assignors to Owens-Illinois Glass Company, a corporation of Ohio Application August 30, 1954, Serial No. 452,923

8 Claims. (Cl. 117—38)

Our invention relates to methods of printing or decorating glass articles or ceramic surfaces with organic inks. Glass articles are commonly decorated by the use of ceramic color material comprising metal oxides, such material being suspended in a volatile vehicle or suspension medium. The material may be applied by stenciling or well known screen decorating processes. The articles are then subjected to a high temperature treatment to evaporate the volatile suspension medium and fuse the color materials into the glass.

The use of organic inks or color materials offers substantial advantages over the above method, particularly as the curing may be effected at comparatively low temperatures and in a short time of treatment. A serious objection which has been found in the use of such organic materials relates their inability to withstand the action of moisture for any length of time. Many types of ink would be satisfactory if the decoration could be kept completely dry. However, seasonal high humidities or subjection of a glass article or container to water during filling or use cause the ink to fail. Prolonged soaking in water is a rapid method of determining what would ultimately happen to the printed glass articles due to atmospheric conditions.

An object of the present invention is to provide an organic ink or material and method of using the same by which the above objections are overcome and the use of such organic ink with its attendant advantages is made practical.

In practicing the present invention epoxy resins are used as the base for making the inks for decorating glassware or the like. We use an epoxy resin because it is more adherent to glass and forms a harder and tougher film than any other resin or organic material of which we are aware. Our work with epoxy resins has shown that the use of citric acid as a curing agent results in better adhesion between the glass and the ink film when the article is soaked in water than any other curing agent which we have tried. The use of citric acid as a curing agent for epoxy resins has heretofore been proposed but such use has not proved entirely satisfactory, particularly as with the methods used the printing or decorating has not proved to be sufficiently resistant to moisture.

We have discovered that the age of the ink at the time it is applied to the glass is all important in determining whether or not the printed decoration will be resistant to moisture. We have found that with ink components of the formulation hereinafter given, the length of time between the compounding of the ink and the printing of the glassware therewith, is a controlling factor in obtaining satisfactory results. We have found that when the ink is applied to the glass on the day that the ink components are combined and milled the decoration is hard and resistant to moisture or soaking in water, but is dull and lacking in gloss. On the following two days after the ink is compounded and while it remains in the container or in bulk it undergoes a change so that when it is printed or applied to the glassware the decoration is glossy and also hard and resistant to soaking in water without softening or becoming loose on the glass. Following this three day period the ink continues to print glossy and hard but on soaking in water the decoration becomes soft and can be easily scratched off. This effect is progressive but rapid. The differences of one additional day's aging can readily be seen in the durability of the label or decoration. The ink during the aging period remains in bulk, being stored in cans or containers and kept at room temperature, or any temperature from about 40° F. to 100° F.

We have found that viscosity measurements of the ink are correlated with the aging effect. In the accompanying drawing, the view is a graph illustrating the viscosity versus time. The time is indicated in days. The viscosity is charted in accordance with measurements taken daily by means of a spreadometer. In this test a given volume of ink is placed on a flat glass surface and pressed between said surface and a pressure plate. The distance it spreads in one minute is used as an empirical measure of viscosity. The plot of viscosity versus time as shown on this graph by the plotted line 9 is typical. It will be observed that the viscosity during the first day after milling drops from the point 10 to the point 11. During the second day the viscosity has risen to the point 12 which is approximately its original viscosity. This is the day when optimum gloss is obtained and printing is recommended. The viscosity continues to rise and it is found that by the 5th day a label or decoration printed with this ink is not resistant to soaking. This method of controlling the printing operation and durability by using the ink within a given specific period of time after the ink is compounded, we believe to be unique and heretofore unknown.

Examples of ink formulations which we have found give good results are as follows:

EXAMPLE 1

| | Parts |
|---|---|
| Epoxy resin (Epon 828) | 10 |
| Pigment (Titanox RA–50) | 10 |
| Citric acid | 2.5 |
| Carbitol (diethylene glycol monoethyl ether) | 3.75 |
| Silicone (GE 81392) | 0.26 |

The resin is an epoxy hydroxy polyether resin. The term "Epon" in the above example is the trade name for epoxy resins supplied by the Shell Chemical Corporation. The "Epon 828" is an epoxy resin having a viscosity (Gardner-Holdt) of $Z_5$—$Z_6$, an epoxide equivalent (grams of resins containing 1 gram equivalent of epoxide) of 190–210, and a melting point of 8° C. to 12° C. Such resins may be obtained on the open market as there are a number of producers supplying such resins.

The pigment known by the trade name Titanox is a titanium dioxide and is supplied by the Titanium Pigment Corporation, a division of the National Lead Company. The Carbitol is a diethylene glycol monoethyl ether supplied under this trade name by the Carbide and Carbon Chemicals Corporation. It is used in the above formulation to dissolve the citric acid. The silicone (GE 81392) is a product supplied by the General Electric Company. It serves in the above formulation as a leveling agent.

The hardness of printed films may be determined by means of a graduated series of drawing pencils. Pencils with a lead hardness of from 1 H to 9 H are used to scratch the ink film. The ink is given a hardness rating equivalent to the hardest pencil which will not scratch the film. The ink is applied by means of a silk screen or a doctor blade. Following is a typical series of hardness values of a film of ink supplied by the above formula, which demonstrates the softening of the ink film when an over-age ink is used.

Effect of soaking on pencil hardness of film

| Time of Soak | Age of Ink in Days, When Printed | | | | | |
| --- | --- | --- | --- | --- | --- | --- |
|  | 0 | 1 | 2 | 3 | 4 | 5 |
| 0 | 9+ | 9+ | 9+ | 9+ | 9+ | 9+ |
| 1 hr | 9+ | 9+ | 9+ | 6 | 1 | (*) |
| 1 day | 9+ | 9+ | 9+ | 1 | 1 | (*) |
| 1 wk | 9+ | 9+ | 9+ | 2 | 2 | (*) |

* Scratches with fingernail.

Thus, as shown by the above tabulation, when the ink is printed within three days from the time it is made, the printed film remains hard and adherent upon prolonged soaking. We have observed that continuous soaking for several weeks or more has no appreciable effect. On the fourth day a noticeable softening of the print occurs upon soaking, and when the ink is printed after aging six days, it softens with only one hour of soaking to the extent that it can be scratched with the fingernail. It should be explained that 1 H pencil is harder than the fingernail.

The explanation of these phenomena is not fully apparent, but it is believed that a polymerization of the resin progresses while the ink remains in bulk, and the partially polymerized ink is not nearly so adherent as fresh ink. The fact that the increase in viscosity of the ink in the container correlates with the ink's printing stability leands credence to this theory.

We have conducted experiments which have shed some additional light on the aging of the ink prior to use and its effect on the adhesion to glass. Such experiments include a measurement of the free citric acid content in the ink in relation to the age of the ink. In these experiments citric acid (40% solution in Carbitol) was mixed with the epoxy resin (Epon 828) in the proportion of 2.5 to 10, and measurements of the free acid present were made periodically by means of titration with a standard base. The pigment was not added as it would obscure the end-point of the titration. The following results were obtained:

| Time of storage, hours: | Percent free acid |
| --- | --- |
| 0 | 100 |
| 24 | 100.3 |
| 48 | 95.0 |
| 72 | 90.5 |
| 144 | 83.1 |

It will be noted that the change in free acid content correlates with the change in viscosity of the ink, as shown in the accompanying graph. Both of these phenomena, namely, the change in viscosity and the change in acid content, indicate that the citric acid is reacting with the Epon resin as it stands in the container.

Cure time of the ink in relation to age of the ink

We have discovered that an ink which has aged for a number of days prior to printing does not cure as rapidly as a freshly prepared ink so that an aged ink baked on the same schedule as a fresh ink will be under-cured. This is at least part of the cause of poor moisture resistance.

EXAMPLE 2

A white ink with a wetting agent (lecithin) added to prevent de-mixing during the first day.

| | Parts |
| --- | --- |
| Epoxy resin (Epon 828) | 10 |
| Pigment (Titanox RA–50) | 10 |
| Citric acid | 2.5 |
| Carbitol (solvent) | 3.75 |
| Silicone (GE 81392) leveling agent | 0.26 |
| Lecithin (Alcolec–HO–410 phosphorlated) wetting agent | 0.10 |

The "Lecithin" in the above formulation is a protein material derived from soybeans and is supplied by the American Lecithin Company, Inc. It is used in this example as a wetting agent. As above pointed out in connection with Example 1, an ink containing Epon 828, Titanox and citric acid, prints flat or dull during the first 24 hours after it is compounded. This is caused by the citric acid de-mixing or flocculating the pigment. The wetting agent in the present example prevents this effect to a large extent; however, immediate gloss is still not apparent.

EXAMPLE 3

A royal blue ink:

| | Parts |
| --- | --- |
| Epoxy resin (Epon 828) | 10 |
| Titanox RA–50 | 2 |
| Holland BT–406–Blue (organic pigment) | 2 |
| Citric acid | 2.5 |
| Carbitol (solvent) | 3.75 |
| Silicone (GE 81392) leveling agent | 0.04 |
| Lecithin (Alcolec–HO–410 phosphorlated) wetting agent | 0.1 |

It will be noted that the above Example 3 differs from Example 2 mainly by the addition of the organic color pigment and reduction of the titanium dioxide pigment content. This color pigment and that specified in the following Example 4 are supplied by the Holland Color Company.

EXAMPLE 4

A dark green ink:

| | Parts |
| --- | --- |
| Epoxy resin (Epon 828) | 10 |
| Titanox RA–50 | 2 |
| Holland GT 422 Permanent Green (organic pigment) | 2 |
| Citric acid | 2.50 |
| Carbitol (solvent) | 3.75 |
| Silicone (GE 81392) leveling agent | 0.09 |
| Lecithin (Alcolec HO–410 phosphorlated) wetting agent | 0.1 |

In each of the above formulations the epoxy resin (Epon 828) may be replaced by Epon 834 resin, also supplied by the Shell Chemical Corporation.

Also in each of the above examples "Cellosolve," an ethylene glycol monoethylether, supplied by Carbide and Carbon Chemical Corporation, may be used as the solvent in place of Carbitol.

In the above examples the proportion of citric acid specified is 2.5 parts. We have found in our experiments that the ratio of 2.5 parts of citric acid to 10 parts epoxy resin is the optimum ratio. Some variation in this proportion is permissible but we have found that about 2 to 3 parts of the citric acid to 10 parts of the resin represents the workable limits.

The pigments in the above formulations are inert additives and therefore of no importance insofar as the chemistry of our invention is concerned. In practice the amount of pigment added is controlled to a considerable extent by the desired viscosity of the resulting ink. The pigment bodies up the ink, and too much cannot be added or the ink will be too stiff. For example, in a white ink we are able to add equal parts of titanium dioxide and resin, whereas in some colored inks the coloring pigment has a greater bodying effect and it is not possible to add as much. In addition the amount of pigment and coloring material added is also controlled by the degree of opacity and color brilliance which is desired.

Our invention provides an organic ink which is suitable for use with silk screen methods now in extensive use for printing and decorating glassware. We have discovered that an organic ink comprising an epoxy resin in a liquid form, when used in formulas such as herein set forth, gives highly satisfactory results in silk screen printing operations. In the above mentioned prior art methods employing epoxy resins and citric acid as a curing agent, as described, for example, in the patent Buck #2,569,920, October 2, 1951, the resin used is a solid friable resin in all of the examples given in the patent. We have found that with solid resins when put in solution the amount of solvent necessary to dissolve the resin of necessity gives a coating material which is too thin for silk screen application. Also inks which are compounded from resins which are solid in their natural state tend to dry out on a silk screen, the resinous content tending to revert to its solid state. In our work we have discovered these deficiencies and have given up the use of solid epoxy resin in favor of resins which are liquid in their normal state. Such liquid resins are available in a range extending from a relatively thin liquid state up through extremely viscous liquids and on to friable solids, depending upon the length of the polymer chain constituting the resin. By using liquid resins we avoid the use of large amounts of solvent and thus readily control the viscosity of the resulting ink, and also the ink never dries on the screen, because upon the loss of solvent the resin is still liquid.

Mixing procedures

In practicing our invention various methods of mixing the ingredients of the several formulations may be employed.

*Three roll mill.*—All of the ingredients may be mixed together by hand with a spatula. A larger commercial batch would be mixed with an electric paddle stirrer. This mixture is then milled, giving it four passes on a high-speed three-roll mill which is common to the ink and paint industry. When thus mixed, one day should elapse before the ink is printed.

*Ball mill.*—Another method which we have employed with superior results consists in using a laboratory ball mill (two-quart size). In this case all the ingredients except the citric acid in Carbitol solution are milled in the ball mill for 54 hours. At the end of this time the citric acid in Carbitol solution is added by mixing it in with a simple electric stirring device. The ink may then be used immediately and should be used within 24 hours.

*Curing the ink.*—This ink, whose reactive constituents are epoxy resins and citric acid, must be cured by heating. Any reaction of this type is controlled by time and temperature, a long bake at a low temperature being equivalent to a short bake at a high temperature. It is desirable to do the baking in as short a time as possible, so we choose the highest temperature permissible. The upper limit is the highest temperature that will not cause discoloration of the ink. We have found that heating the glass substrate at 400–425° F. for ten minutes gives adequate cure. A practical range in the heating cycle is from 30 minutes at 375° F. to 10 minutes at 475° F.

We have found that under-curing the ink is detrimental to the moisture resistance. The ink softens and comes loose upon soaking. On the other hand, over-curing appears to be also deleterious. In this case the ink does not soften but does come loose from the glass upon soaking.

Modifications may be resorted to within the spirit and scope of our invention.

We claim:

1. An organic ink for printing on glass, said ink comprising the reaction product of compounding the following ingredients in substantially the following proportions, namely:

| | Parts |
|---|---|
| A liquid epoxyhydroxy polyether resin | 10 |
| Titanium dioxide | 10 |
| Citric acid | 2.5 |
| Diethylene glycol monoethyl ether | 3.75 |
| A liquid silicone | 0.26 |

2. The method which comprises compounding and reacting a mixture comprising about 10 parts liquid epoxy resin, 2.5 parts citric acid, a solvent for the citric acid and a pigment, thereby producing an organic ink, aging the ink for a period of from one to three days after it is compounded, and at the expiration of that period printing a film of the ink on a glass surface.

3. The method defined in claim 2, said method including the step of curing the printed film by heating the glass substrate at a temperature of about 400 to 425° F. for about ten minutes.

4. The method defined in claim 2, said method including the step of curing the printed film by subjecting it to a temperature within the range of about 30 minutes at 375° F. to 10 minutes at 475° F.

5. A printing ink applicable to glass thru a silk screen and formed by compounding the following ingredients in substantially the following proportions:

| | Parts |
|---|---|
| A liquid epoxyhydroxy polyether resin | 10 |
| Titanium dioxide | 10 |
| Citric acid | 2.5 |
| Diethylene glycol monoethyl ether | 3.75 |
| A liquid silicone | 0.04 |
| Lecithin | 0.1 |
| An organic pigment | 2 |

6. An organic ink formulation comprising the following ingredients in substantially the following proportions, namely, a liquid epoxyhydroxy polyether resin 10 parts, citric acid from 2 to 3 parts, 3.75 parts solvent for the citric acid, a pigment, and a leveling agent.

7. In a method of decorating glass by the application of a coating composition thru a silk screen, the steps of applying to the screen and the glass a coating composition consisting essentially of 10 parts of a liquid epoxyhydroxyl polyether resin, 2.5 parts citric acid, a solvent for the citric acid and a pigment, the composition being previously compounded and aged for a period of time ranging from 24 to 72 hours prior to its application, and curing the applied composition on the glass at a temperature of from 375° F. to 475° F. for a time ranging from 30 to 10 minutes.

8. In a method of decorating glass by the application of a coating composition thru a silk screen, the steps of applying to the screen and the glass a coating composition consisting essentially of a liquid epoxy resin, citric acid and a pigment, the composition being previously compounded and aged for a period of time ranging from 24 to 72 hours prior to its application, and curing the applied composition on the glass at an elevated temperature.

References Cited in the file of this patent

UNITED STATES PATENTS

| 2,121,680 | Arvin | June 21, 1938 |
| 2,324,483 | Castan | July 20, 1943 |
| 2,569,920 | Buck et al. | Oct. 2, 1951 |